United States Patent
Edry et al.

(10) Patent No.: US 10,149,089 B1
(45) Date of Patent: Dec. 4, 2018

(54) REMOTE PERSONALIZATION OF AUDIO

(71) Applicant: MICROSOFT TECHNOLOGY LICENSING, LLC, Redmond, WA (US)

(72) Inventors: Philip Andrew Edry, Seattle, WA (US); Todd Ryun Manion, Seattle, WA (US); Steven Marcel Elza Wilssens, Kenmore, WA (US); Robert Norman Heitkamp, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/610,543

(22) Filed: May 31, 2017

(51) Int. Cl.
*H04S 1/00* (2006.01)
*H04S 7/00* (2006.01)
*H04L 29/08* (2006.01)

(52) U.S. Cl.
CPC ............. *H04S 7/303* (2013.01); *H04L 67/10* (2013.01); *H04S 1/002* (2013.01); *H04S 7/30* (2013.01); *H04S 2400/01* (2013.01); *H04S 2400/11* (2013.01); *H04S 2420/01* (2013.01); *H04S 2420/11* (2013.01)

(58) Field of Classification Search
CPC ........ H04S 7/303; H04S 7/30; H04S 2400/01; H04S 2420/01; H04S 2420/11; H04S 2400/11; H04S 1/002; H04R 3/00; H04R 1/406; H04L 67/10
USPC ...................................... 381/74, 303, 92, 26
See application file for complete search history.

(56) References Cited

U.S. PATENT DOCUMENTS

| | | | | |
|---|---|---|---|---|
| 2003/0031333 | A1* | 2/2003 | Cohen | H04S 7/301 381/303 |
| 2008/0253578 | A1* | 10/2008 | Breebaart | H04R 25/552 381/17 |
| 2012/0183161 | A1* | 7/2012 | Agevik | H04S 7/302 381/303 |
| 2013/0177166 | A1* | 7/2013 | Agevik | H04S 1/005 381/74 |
| 2015/0106475 | A1* | 4/2015 | Tan | H04R 5/04 709/217 |
| 2016/0323666 | A1* | 11/2016 | Ajmera | H04S 7/30 |
| 2017/0339503 | A1* | 11/2017 | Lyren | G10L 19/22 |

* cited by examiner

*Primary Examiner* — Vivian Chin
*Assistant Examiner* — Ubachukwu Odunukwe (57) ABSTRACT

The present disclosure provides a number of techniques for personalization of audio for communication to an endpoint device. According to one technique, a cloud-based computing device may receive media data from a media platform, and generate depersonalized audio data based on the media data, the depersonalized audio data including at least one audio component associated with the media platform. The technique may further generate user personalized audio data based on the depersonalized audio data. The user personalized audio data may include at least one audio component personalized based on a unique head-related transfer function (HRTF) data associated with a user or default HRTF data. The user personalized audio may be communicated to the endpoint device for consumption by the user. Such techniques reduce the need for advanced audio processing technologies on client systems and makes personalized audio more available to users.

18 Claims, 4 Drawing Sheets

REMOTE PERSONALIZATION OF AUDIO

BACKGROUND

This disclosure generally relates to digital audio signal processing. In particular, the disclosure is directed to digital audio signal processing of sounds moving through three-dimensional (3D) space.

3D positional audio in multimedia applications or renderings uses signal processing to localize a single sound to a specific location in three-dimensional space around a listener. 3D positional audio is one common sound effect used in multimedia applications, such as interactive games or other immersive reproductions, because the sound effect, such as the sound of an aircraft, can be localized to a specific position. This specific position, for instance, can be positioned with respect to a listener and even move around the listener while other sounds are positioned separately.

3D positional audio generally refers to a system where multimedia applications can use application programming interfaces (API's) to set the position of sounds in 3D space. Head related transfer function (HRTF) is one mechanism for rendering 3D positional audio. Specifically, HRTF is a method by which sounds are processed to localize them in space around a user, such as a player or consumer of a videogame. The HRTF is frequently personalized for the user.

Although the HRTF mechanism is effective in generating 3D positional audio that is personalized for a user, the process of generating the personalized 3D positional audio requires a large amount of processing power. This is a particular reason why 3D audio hardware accelerators are common on personal computers (PCs) and gaming consoles. However, some computing devices may not have a 3D audio hardware accelerator(s) capable of generating 3D positional audio. For example, smaller computing devices, such as tablet computers, mobile phones, mobile computing devices, or the like, may have a size and/or shape that does not allow for the use of a 3D audio hardware accelerator Similarly, legacy computing devices may not include a 3D audio hardware accelerator. Therefore, currently, these smaller computing devices and/or legacy computing devices are unable to produce personalized 3D positional audio, which greatly enhances a user's consumption of multimedia applications or renderings.

It is with respect to these and other considerations that the disclosure made herein is presented.

SUMMARY

The techniques disclosed herein provide a high fidelity, rich, and engaging experience for consumers of streaming services. The streaming services may include audio media for consumption by consumers. Furthermore, the streaming services may include media that includes video and audio components. In some implementations, a cloud-based server or network system can generate an Ambisonics-based audio media output, a 3D audio media output, a channel-based media output, or any other type of suitable media output. The media output may be processed by a consumer's or user's head related transfer function (HRTF) data to create personalized audio output for the user. Alternatively, the media output may be processed by a default HRTF data to create personalized audio output for a user. Processing and generating the personalized audio output may be performed most advantageously by the cloud-based server for endpoint devices not possessing advanced audio processing technology typically required to generate such personalized audio outputs.

Processing using the HRTF data may be performed by the cloud-based server or network system. The user's personalized audio output may then be communicated to an endpoint device, such as a tablet computer, mobile phone, mobile computing device, or the like. In some implementations, the personalized audio output may be streamed to the endpoint device.

In some implementations, unique HRTF data may be stored on the cloud-based server or network system and associated with individual users. This unique HRTF data may be used to create the personalized audio output that is streamed to computing devices associated with the individual users. The processing and generation of the personalized audio output, using the unique HRTF data, may be performed by the cloud-based server or network system. Accordingly, in some implementations, the generation of the personalized audio output may not be required to be performed by the computing devices associated with the individual consumers or users.

In some implementations, the cloud-based server or network system may include a database containing a plurality of unique HRTF data. One or more of the stored plurality of unique HRTF data may be associated with individual users. Therefore, the cloud-based server network system may process and generate personalized audio output for individual consumers or users based on unique HRTF data linked to those individual consumers or users.

In some implementations, default HRTF data may be stored on the cloud-based server or network system. This default HRTF data may be used to create the personalized audio output that is then streamed to computing devices associated with the individual consumers or users. In some implementations, the default HRTF data may be used when unique HRTF data does not exist for a user recipient of the personalized audio output. Therefore, some implementations may provide for the generation of personalized audio output for individual consumers or users that do not have an associated unique HRTF data stored by the cloud-based server or network system.

In some implementations, the cloud-based server or network system may store a plurality of default HRTF data. For example, a first default HRTF data may be defined for a head size or head size range associated with individual consumers or users. A second default HRTF data may be defined for another head size or head size range associated with individual consumers or users. A third default HRTF may be defined for a particular audio system (e.g., headphones or audio speakers). A fourth default HRTF data may be defined for a range of measurements associated with the user's ears. Additional default HRTF data may be stored by the cloud-based server or network system.

In some implementations, the personalized audio outputs generated by the cloud-based server or network system may be stereo audio streams. The stereo audio streams may further include video components. In some implementations, the personalized audio outputs generated by the cloud-based server or network system may be channel audio streams, such as pulse code modulation (PCM) audio streams. These channel audio streams may also include video components.

In some implementations, the cloud-based server or network system may filter personalized audio outputs generated by unique HRTF data or default HRTF data. The filtered, personalized audio outputs may be communicated or streamed to individual consumers or users. In some implementations, the cloud-based server or network system comprises one or more filters to filter the personalized audio outputs. For example, a first of the one or more filters may be a transducer position compensation filter to filter the personalized audio outputs in order to provide an undistorted frequency spectrum at the entrance to the individual consumer or user's ears. A second of the one or more filters may be a smoothing and equalization filter to remove or compensate for spectral coloration. Other filters may also be implemented and used by the cloud-based server or network system.

In some implementations, the cloud-based server or network system may generate personalized audio outputs using the unique HRTF data or default HRTF data. The generated personalized audio outputs may be communicated or streamed to computing or endpoint devices associated with consumers or users. The computing devices may perform the filtering described above.

In one illustrative example, the cloud-based server or network system may receive media data from a media source, such as a videogame console, videogame entity, video and/or streaming service, or the like. The media data may comprise at least one of 3D audio data, Ambisonics data, and channel-based audio data. Other forms of media data may also be received in some implementations. In another illustrative example, the cloud-based server or network system may store the media data.

The cloud-based server or network system may generate personalized audio outputs or data based on the media data. The personalized audio data may comprise at least one audio component. For example, at least one audio component may include a sequence of audio sounds, frequencies, or other audio components. Thereafter, the cloud-based server or network system communicates the personalized audio data to a consumer or user. The personalized audio data comprises the at least one audio component personalized based on unique HRTF data or default HRTF data.

In some implementations, the unique HRTF data personalizes the media data according to a particular user's biometrics, auditory geometry, and other head-related aspects.

In some implementations, the cloud-based server or network system may receive information data from one or more consumers or users. The information data may include information related to the consumer or user that is usable by the cloud-based server or network system when choosing a default HRTF data for personalizing audio data. In some examples, the information data may include age, gender, weight, and/or medical related data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques disclosed herein provide a high fidelity, rich, and engaging experience for consumers of streaming services. The streaming services may include audio media for consumption by users. Furthermore, the streaming services may include media that includes video and audio components. In some implementations, a cloud-based server or network system generates an Ambisonics-based audio media output, a 3D audio media output, a channel-based media output, or any other type of suitable media output. The media output may be processed by a consumer or user's head related transfer function (HRTF) data to create personalized audio output for the user. Alternatively, the media output may be processed by a default HRTF data to create personalized audio output for a user. Advantageously, processing and generating the personalized audio output from the HRTF data and depersonalized audio data are performed by the cloud-based server. Therefore, an endpoint device to receive the personalized audio output may not be required to possess advanced audio processing technology typically required to generate such personalized audio outputs.

Processing using the HRTF data may be performed by the cloud-based server or network system. The user's personalized audio output may then be communicated to an endpoint device, such as a tablet computer, mobile phone, mobile computing device, or the like. In some implementations, the personalized audio output may be streamed to the endpoint device. Thus, an audio output generated in the cloud, based on personalized HRTF data, can be used for applications like Netflix and other types of linear data. The output can be stereo PCM format or any other suitable format.

In some implementations, unique HRTF data may be stored on the cloud-based server or network system and associated with individual consumers or users. This unique HRTF data may be used to create the personalized audio output that is streamed to computing devices associated with the individual consumers or users. The processing and generation of the personalized audio output, using the unique HRTF data, may be performed by the cloud-based server or network system. Accordingly, in some implementations, the generation of the personalized audio output may not be required to be performed by the computing devices associated with the individual consumers or users.

In some implementations, the cloud-based server or network system may include a database containing a plurality of unique HRTF data. One or more of the stored plurality of unique HRTF data may be associated with individual consumers or users. Therefore, the cloud-based server network system may process and generate personalized audio output for individual consumers or users based on unique HRTF data linked to those individual consumers or users.

In some implementations, default HRTF data may be stored on the cloud-based server or network system. This default HRTF data may be used to create the personalized audio output that is streamed to computing devices associated with the individual consumers or users. In some implementations, the default HRTF data may be used when unique HRTF data does not exist for a recipient of the personalized audio output. Therefore, some implementations provide for the generation of personalized audio output for individual consumers or users that do not have an associated unique HRTF data.

In some implementations, the cloud-based server or network system may store a plurality of default HRTF data. For example, a first default HRTF data may be defined for a head size or head size range associated with individual consumers or users. A second default HRTF data may be defined for another head size or head size range associated with individual consumers or users. A third default HRTF may be defined for a particular audio system (e.g., headphones or audio speakers). A fourth default HRTF data may be defined for a range of measurements associated with the user's ears or other physical features. Additional default HRTF data may be stored by the cloud-based server or network system.

In some implementations, the personalized audio outputs generated by the cloud-based server or network system may be stereo audio streams. The stereo audio streams may further include video components. In some implementations, the personalized audio outputs generated by the cloud-based server or network system may be channel audio streams, such as pulse code modulation (PCM) audio streams. These channel audio streams may also include video components.

In some implementations, the cloud-based server or network system filters personalized audio outputs having been generated by unique HRTF data or default HRTF data. The filtered personalized audio outputs may be communicated or streamed to respective individual consumers or users. In some implementations, the cloud-based server or network system comprises one or more filters to filter the personalized audio outputs. For example, a first of the one or more filters may be a transducer position compensation filter to filter the personalized audio outputs in order to provide an undistorted frequency spectrum at the entrance to the individual consumer or user's ears. A second of the one or more filters may be a smoothing and equalization filter to remove or compensate for spectral coloration. Other filters may also be implemented and used by the cloud-based server or network system.

In some implementations, the cloud-based server or network system generates personalized audio outputs using the unique HRTF data or default HRTF data. The generated personalized audio outputs may be communicated or streamed to computing devices associated with consumers or users. The computing devices may perform the filtering describedabove.

In one illustrative example, the cloud-based server or network system may receive media data from a media source, such as a videogame console, videogame entity, video and/or streaming service, or the like. The media data may comprise at least one of 3D audio data, Ambisonics data, and channel-based audio data. Other forms of media data may also be received in some implementations. In another illustrative example, the cloud-based server or network system may store the media data.

The cloud-based server or network system may generate personalized audio outputs or data based on the media data. The personalized audio data may comprise at least one audio component. For example, at least one audio component may include a sequence of audio sounds, frequencies, or other audio components. Thereafter, the cloud-based server or network system communicates the personalized audio data to a consumer or user. The personalized audio data comprises the at least one audio component personalized based on unique HRTF data or default HRTF data.

In some implementations, the unique HRTF data personalizes the media data according to a particular user's biometrics, auditory geometry, and other head-related aspects.

In some implementations, the cloud-based server or network system may receive information data from one or more consumer or users. The information data may include information related to the consumer or user that is usable by the cloud-based server or network system when choosing a default HRTF data for personalizing audio data. In some examples, the information data may include age, gender, weight, and/or medical related data.

Figure 1:
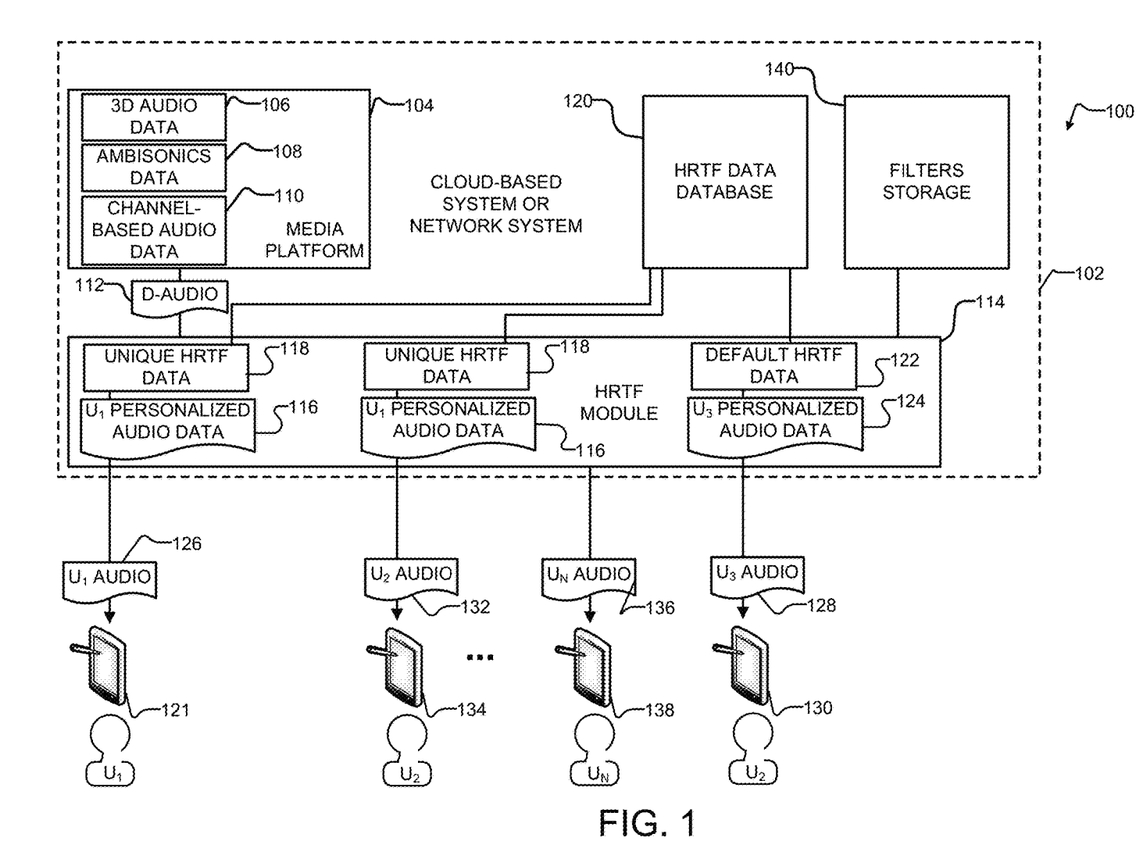
FIG. 1 is a diagram illustrating an example operating environment in which one or more systems can operate to facilitate personalization of audio.

Turning now to the drawings, FIG. 1 is a diagram illustrating an example operating environment 100 in which one or more systems 102 (also referred to herein as a cloud-based computing device) may operate to facilitate personalization of audio for one or more users $U_1$ through $U_N$, where N is an integer greater than or equal to 1. Generally, the one or more systems 102 may be remote from the one or more users $U_1$ through $U_N$. In some implementations, the one or more systems 102 may be cloud-based systems. In some implementations, the one or more systems 102 may be Internet cloud-based systems or more generally networked systems linked to Internet or other suitable networks.

The one or more systems 102 may comprise one or more computing devices. In general, the one or more systems 102 may comprise one or more of the elements and components illustrated in FIG. 4. Furthermore, in general the one or more systems 102 may be a media system such as a media computing device, gaming console, gaming system, VR system, the media content provider system or other suitable system configured to provide a rich and immersive media experience for the participants $U_N$.

The system 102 may include a media platform 104. The media platform 104 may be configured to receive or generate different media data. For example, the media platform may receive or generate 3D audio data 106, Ambisonics data 108, and channel-based audio data 110.

Although other technologies may be used, configurations utilizing Ambisonics technology may provide additional performance benefits given that output audio based on the Ambisonics technology may be rotated after the fact, e.g., after the output audio has been generated.

Generally described, output audio, e.g., an audio output, based on the Ambisonics technology involves a full-sphere surround sound technique. In addition to the horizontal plane, the output audio covers sound sources above and below the listener. Thus, in addition to defining a number of other properties for each stream, each stream may be associated with a location defined by a three-dimensional coordinate system.

An audio output based on the Ambisonics technology may also contain a speaker-independent representation of a sound field called the B-format, which may be configured to be decoded by a listener's (spectator or participant) output device or system. This configuration allows the system 102 to record data in terms of source directions rather than loudspeaker positions, and offers the listener a considerable degree of flexibility as to the layout and number of speakers used for playback.

However, other forms of 3D audio data including the 3D audio data 106 may also be implemented. In these configurations, any suitable form of 3D audio data 106 may be used. Similarly, channel-based audio data 110 may also be utilized. Channel-based audio data 110 may include Dolby and/or Dolby Atmos in some configurations. In these scenarios, the system 102 may implement a variety of media data formats thereby enhancing experiences across many different sessions such as video games, VR experiences, media experiences, and the like.

The media platform 104 may use received or stored media data to generate depersonalized audio data 112. The depersonalized audio data 112 may include one or more audio components such as bass, treble, frequency ranges, frequency attributes, and other components, such as video components. Generally, at least some of the components are associated with the 3D audio data 106, Ambisonics data 108, and/or the channel-based audio data 110. The depersonalized audio data 112 may lack personalization for the users, (e.g., the user $U_1$).

An HRTF module 114 may receive the depersonalized audio data 112 and process the depersonalized audio data 112 to create personalized audio data 116. Alternatively, the HRTF module 114 may simply receive media data from the media platform 104, and process such media data to create personalized audio data 106. In some implementations, HRTF module 114 may be configured as an audio processing module operative to receive unique HRTF data 118 associated with the user $U_1$. The unique HRTF data 118 may be provided by an HRTF database 120. In one implementation, the HRTF database 120 includes a plurality of unique HRTF data 118. Each of the plurality of unique HRTF data 118 may be linked to or associated with a user (e.g., users $U_1$ through $U_N$.) Furthermore, in some implementations, the HRTF database 120 includes one or more default HRTF data 122.

The unique HRTF data 118 may include biometric data related to and linked to a particular user, e.g., the user $U_1$. For example, a HRTF is a transfer function that characterizes how an ear receives a sound from a point in space. As sound strikes the listener, the size and shape of the head, ears, ear canal, density of the head, size and shape of nasal and oral cavities, all transform the sound and affect how it is perceived, boosting some frequencies and attenuating others. The HRTF data 118 may describe this transfer function for the participant $U_1$ and allow the HRTF module 114 to appropriately personalize audio for the user $U_1$.

In some implementations, the HRTF database 120 stores a plurality of unique HRTF data 118. Each of the stored plurality of unique HRTF data 118 may be linked to a user, such as the user $U_1$. The account information, for example, associated with the user may be used by the system 102 to retrieve unique HRTF data 118 linked to a user. Other information may also be used to retrieve unique HRTF data 118 that is linked to a user. The account information and/or other information may be communicated to the system 102 by way of an endpoint device, such as the endpoint device 121.

The default HRTF data 122 may include biometric data not linked to a particular user, e.g., the user $U_3$. For example, a HRTF is a transfer function that characterizes how an ear receives a sound from a point in space. As sound strikes the listener, the size and shape of the head, ears, ear canal, density of the head, size and shape of nasal and oral cavities, all transform the sound and affect how it is perceived, boosting some frequencies and attenuating others. The default HRTF data 122 may describe this function that is appropriate for a plurality of users and which allows the HRTF module 114 to appropriately personalize audio for at least one of the plurality of users (e.g., user $U_3$) and create personalized audio data 124.

In some implementations, the HRTF data database 120 stores a plurality of default HRTF data 122. For example, a first default HRTF 122 data may be defined for a head size or head size range associated with individual consumers or users. A second default HRTF data 122 may be defined for another head size or head size range associated with individual consumers or users. A third default HRTF data 122 may be defined for a particular audio system (e.g., headphones or audio speakers). A fourth default HRTF data 122 may be defined for a range of measurements associated with the user's ears. Additional default HRTF data 122 may be stored by the cloud-based server or network system. The network system 100 may be configured to select a default HRTF data 122 from the plurality of default HRTF data 122 based on information provided by a user (e.g., user $U_3$) For example, the user may provide information to assist the network system 100 in selecting a default HRTF data 122 from the plurality of default HRTF data 122. The provided information may be contained in a preference data file that includes personal information associated with the user (e.g., head size, a type of audio system used by the user, and/or ear related information of the user). The preference data file may be communicated to the network system 100 by way of a computing device, such as the endpoint device 130. Alternatively, the network system 100 may request that the computing device stream the information to assist the network system 100 in selecting the default HRTF data 122, in advance of establishing a media stream in session with the computing device. The default HRTF data 122 can be selected based on one or more factors, such as a type of user activity, a type of media that is being utilized, a location of a user, a location of a computer, a type of speaker system, a type of clothing a user is wearing, a medical condition of a user, and/or other contextual data related to the user.

The HRTF module 114 may output user personalized output audio 126 to the user $U_1$, based on the user personalized audio data 116 and the unique HRTF data 118. For example, the HRTF module 114 or system 102 may direct an endpoint device 121 to render the user personalized output audio 126 for the user $U_1$.

Similarly, the HRTF module 114 may output user personalized output audio 128 to the user $U_3$, based on the user personalized audio data 124 and the default HRTF data 122. For example, the HRTF module 114 or system 102 may direct an endpoint device 130 to render the user personalized output audio 128 for the user $U_3$.

Thus, as described above, the one or more systems 102 may receive media data, process media data to create a first output of depersonalized audio data 112, and process the media data or depersonalized audio data to create personalized audio data based on unique HRTF data 118 or default HRTF data 122. As further illustrated in FIG. 1, additional users may be in communication with the one or more systems 102. For example, the system 102 may create user personalized output audio 132 rendered at endpoint device 134 for user U₂ Similarly, the system 102 may create user personalized output audio 136 rendered at endpoint device 138 for user U_N.

The one or more systems 102 may also include a filters storage 140. The filters storage 104 may include a plurality of filters to filter (e.g., enhance) personalized audio outputs provided by the one or more systems 102. In some implementations, one or more of the plurality of filters may be used to filter the personalized audio outputs from the HRTF module 114. In some implementations, a first of the one or more filters may be a transducer position compensation filter to filter the personalized audio outputs in order to provide an undistorted frequency spectrum at the entrance to the individual customer or user's ears. A second of the one or more filters may be a smoothing and equalization filter to remove or compensate for spectral coloration. Other filters may also be stored in the filters storage 140 and implemented and used by the cloud-based server or network system 102. In some implementations, the filters storage 140 may be included in an endpoint device (e.g., endpoint device 121, 134, 138, and/or 130). Therefore, in some implementations, the endpoint device 121 may perform the filtering described in the foregoing. This would eliminate having the one or more systems 102 perform the described filtering.

It should be appreciated from the foregoing that the processing using the HRTF data 118 and 122 may be performed by the cloud-based server or network system 102. The user's personalized output audio (e.g., user personalized output audio 126) may then be communicated to an endpoint device (e.g., endpoint device 121), such as a tablet computer, mobile phone, mobile computing device, or the like. In some implementations, the personalized output audio may be streamed to the endpoint device. The processing and generation of the personalized output audio, using the unique HRTF data or default HRTF data, may be performed by the cloud-based server or network system 102. Accordingly, in some implementations, the generation of the personalized output audio may not be required to be performed by the endpoint devices associated with the individual consumers or users. Rather, the generation of the personalized output audio may be performed by the cloud-based server or network system 102. Therefore, utilizing the techniques and technologies described herein, endpoint devices that lack the processing capability to generate personalized audio output may nonetheless receive personalized audio that provides for a high fidelity, rich and engaging experience.

In general, the one or more systems 102 may be a platform, server, system, or computing device configured to distribute audio and media data to one or more endpoint devices. In some configurations, the one or more systems 102 can be arranged similar to TWITCH or BEAM. For example, the one or more systems 102 may be arranged to stream or otherwise distribute audio information to several computing devices.

Figure 2:
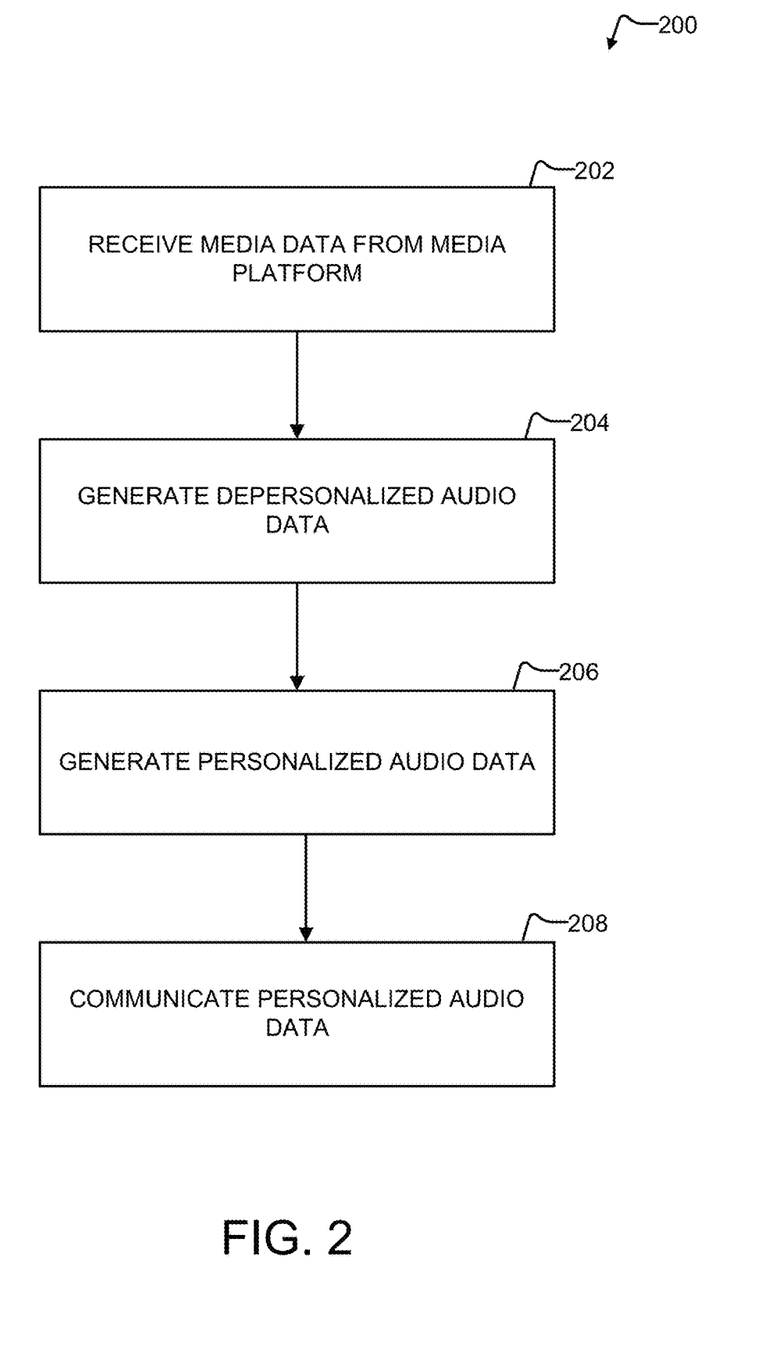
FIG. 2 is a flow diagram of a method of providing personalized audio to one or more users, according to the techniques and technologies disclosed herein.
Figure 3:
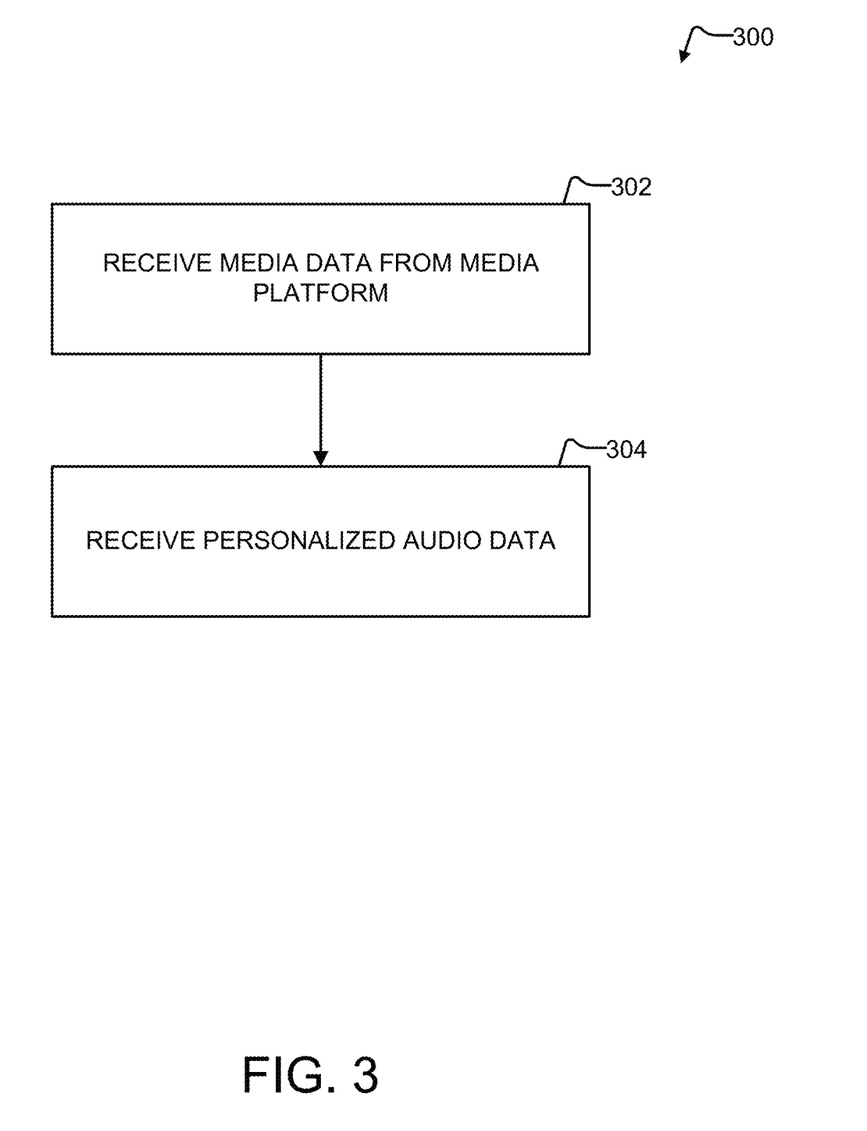
FIG. 3 is a flow diagram of a method of receiving personalized audio at one or more endpoint devices associated with one or more users, according to the techniques and technologies disclosed herein.

Hereinafter, a more detailed discussion of the operation of the systems and components described above is provided with reference to several flow diagrams. As illustrated in FIG. 2 and FIG. 3, aspects of methods 200 and 300 for providing personalized audio are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods may end at any time and need not be performed in their entireties. Some or all operations of the methods, and/or substantially equivalent operations, may be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions may be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein may be referred to variously as states, operations, structural devices, acts, or modules. These operations, structural devices, acts, and modules may be implemented in software, in firmware, in special purpose digital logic, and any combination thereof.

For example, the operations of the methods 200 and 300 are described herein as being implemented, at least in part, by system components, which can comprise an application, component and/or a circuit. In some configurations, the system components may include a dynamically linked library (DLL), a statically linked library, functionality produced by an application programing interface (API), a compiled program, an interpreted program, a script or any other executable set of instructions. Data, such as the audio data, 360 canvas and other data, may be stored in a data structure in one or more memory components. Data can be retrieved from the data structure by addressing links or references to the data structure.

Figure 4:
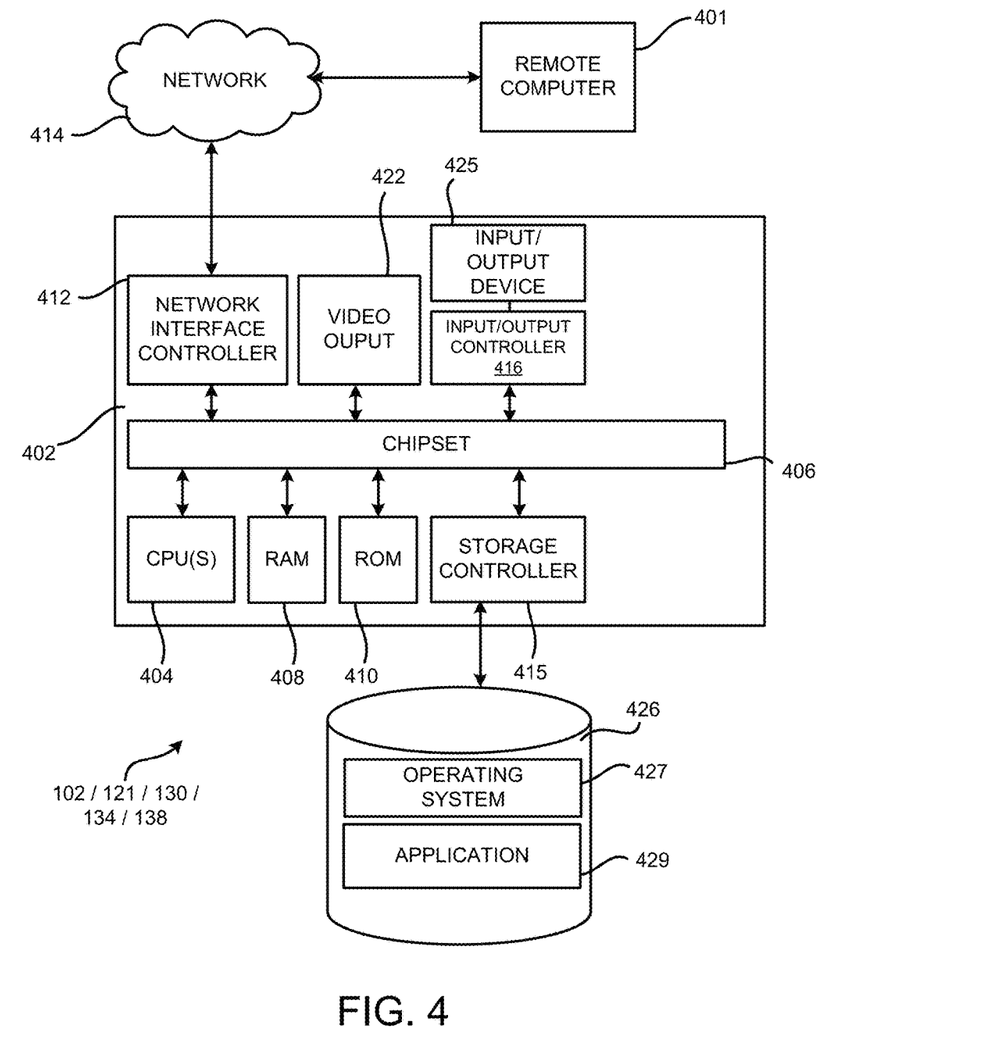
FIG. 4 is a computer architecture diagram illustrating a computing device architecture for a computing device capable of implementing aspects of the techniques and technologies presented herein.

Although the following illustration refers to the components of FIG. 1 and FIG. 4, it can be appreciated that the operations of the methods 200 and 300 may be also implemented in many other ways. For example, the methods 200 and 300 may be implemented, at least in part, by a processor of another remote computer or a local circuit. In addition, one or more of the operations of the methods 200 and 300 may alternatively or additionally be implemented, at least in part, by a chipset working alone or in conjunction with other software modules. Any service, circuit or application suitable for providing the techniques disclosed herein can be used in operations described herein. For example, one or more the operations of the methods 200 and 300 may be implemented by one or more the components illustrated in FIG. 4.

FIG. 2 is a flow diagram of a method 200 of providing personalized audio to one or more users and their associated endpoint devices, according to the techniques and technologies disclosed herein. As shown, the system 102 may receive media data from a media platform 104, at block 202. Generally, the media data comprises at least one of 3D audio data 106, Ambisonics data 108, and channel-based audio data 110. In some implementations, the system 102 receives the media data from an external source (e.g., a videogame console, video and audio streaming service, or other source coupled to the system 102).

Additionally, the received media data may comprise one or more audio components having configured audio levels corresponding to each audio component. For example, the configured audio levels may be depersonalized, default, or otherwise normalized values such that the media data can be processed to create personalized audio data.

The system 102 can also generate depersonalized audio data 112 based on the media data, at block 204. The depersonalized audio data 112 comprises at least one audio component associated with the media platform 104. In some implementations, the depersonalized audio data 112 is the media data from the media platform 104.

The system 102 can generate personalized audio data 116 based on the media data, at block 206. The user personalized audio data 116 comprises the at least one audio component personalized based on a unique head-related transfer function (HRTF) data 118 associated with a user, for example, user $U_1$. For example, the system 102 can increase or decrease the configured audio levels of each audio component based on the unique HRTF data 118 of the user. An audio component, for example, may include a portion of audio signal within a predetermined bandwidth range, e.g., a treble range, middle range, or low range. Alternatively, the user personalized audio data 116 comprises the at least one audio component personalized based on a default HRTF data 122. For example, the system 102 can increase or decrease the configured audio levels of each audio component based on the default HRTF data 122. An audio component, for example, may include a portion of an audio signal within a predetermined bandwidth range, e.g., a treble range, middle range, or low range.

In some implementations, at block 206, the system 102 may receive information, such as user identification information or information data, from an endpoint device, such as the endpoint device 121. The received information may be used by the system 102 in determining whether to use the unique HRTF data 118 or the default HRTF data 122 to generate personalized audio data. For example, the information may include account login information associated with the user, username information associated with the user, access information to gain access to the HRTF data database 120 and/or the system 102, or the like. The information may be used by the system 102 to ascertain if there are one or more unique HRTF data 118 linked to the user that is to receive personalized audio data. In another example, the information may comprise information data including a head size associated with the user, an age associated with user, or gender associated with the user. This type of information data may be used by the system 102 to select a default HRTF data 122 from a plurality of default HRTF data 122 stored in the HRTF data database 120.

The system 102 can communicate the generated personalized audio data 116 to an endpoint device, such as the endpoint device 121 or the endpoint device 130, at block 208.

FIG. 3 is a flow diagram of a method 300 of receiving personalized audio at one or more endpoint devices associated with one or more users, according to the techniques and technologies disclosed herein.

An endpoint device, such as the endpoint device 121 or 130, can communicate information associated with the user of the endpoint device to the cloud-based system 102, at block 302. In some implementations, the information may include user identification information or information data. The received information may be used by the system 102 in determining whether to use the unique HRTF data 118 or the default HRTF data 122 to generate personalized audio data. For example, the information may include account login information associated with the user, username information associated with the user, access information to gain access to the HRTF data database 120, or the like. The information may be used by the system 102 to ascertain if there are one or more unique HRTF data 118 linked to the user that is to receive personalized audio data. In another example, the information may comprise information data including a head size associated with the user, an age associated with user, or gender associated with the user. This type of information data may be used by the system 102 to select a default HRTF data 122 from a plurality of default HRTF data 122 stored in the HRTF data database 120.

The endpoint device receives personalized audio data, such as personalized audio data 116 or 124, from the system 102. The personalized audio data may include at least one audio component personalized based on the unique HRTF data 118 or the default HRTF data 122. In one implementation, the endpoint device that receives depersonalized audio data does not possess sufficient processing power to execute HRTF data. For example, the endpoint device may not have an audio hardware accelerator, such as a 3D audio hardware accelerator, designed to process at least HRTF data and associated audio. Nonetheless, advantageously, the user of the endpoint device may still consume and enjoy personalized audio data that has been preprocessed by a remote computing device or system, such as the cloud-based system 102.

FIG. 4 shows additional details of an example computer architecture for the components shown in FIG. 1 capable of executing the program components described above. The computer architecture shown in FIG. 4 illustrates aspects of a system, such as a game console, cloud-based server computer(s), workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 4 may be utilized to execute any of the software components described above. Although some of the components described herein are specific to the computing devices 102, 121, 130, 134, and 138, it can be appreciated that such components, and other components may be part of any suitable remote computer.

The illustrated computing device includes a baseboard 402, or "motherboard," which is a printed circuit board to which a multitude of components or devices may be connected by way of a system bus or other electrical communication paths. In one illustrative embodiment, one or more central processing units ("CPUs") 404 operate in conjunction with a chipset 406. The CPUs 404 may be standard programmable processors that perform arithmetic and logical operations necessary for the operation of the computing device.

The CPUs 404 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 may provide an interface to a RAM 408, used as the main memory in the computing device. The chipset 406 may further provide an interface to a computer-readable storage medium such as a read-only memory ("ROM") 410 or non-volatile RAM ("NVRAM") for storing basic routines that help to startup the computing device and to transfer information between the various components and devices. The ROM foreign-owned and or NVRAM may also store other software components necessary for the operation of the computing device in accordance with the embodiments described herein.

The computing device may operate in a networked environment using logical connections to remote computing devices and computer systems through a network 414, such as the local area network. The chipset 406 may include functionality for providing network connectivity through a network interface controller (NIC) 412, such as a gigabit Ethernet adapter. The NIC 412 is capable of connecting the computing device to other computing devices over the network. It should be appreciated that multiple NICs 412 may be present in the computing device, connecting the computer to other types of networks and remote computer systems. The network allows the computing device to communicate with remote services and servers, such as the remote computer 401. As can be appreciated, the remote computer 401 may host a number of services such as the XBOX LIVE gaming service provided by MICROSOFT CORPORATION of Redmond, Wash. In addition, as described above, the remote computer 401 may mirror and reflect data stored on the computing device and host services that may provide data or processing for the techniques described herein.

The computing device may be connected to a mass storage device 426 that provides non-volatile storage for the computing device. The mass storage device 426 may store system programs, application programs, other program modules, and data, which have been described in greater detail herein. The mass storage device 426 may be connected to the computing device through a storage controller 415 connected to the chipset 406. The mass storage device 426 may consist of one or more physical storage units. The storage controller 415 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 426, other storage media and the storage controller 415 may include MultiMediaCard (MMC) components, eMMC components, Secure Digital (SD) components, PCI Express components, or the like.

The computing device may store data on the mass storage device 426 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 426 is characterized as primary or secondary storage, and the like.

For example, the computing device may store information to the mass storage device 426 by issuing instructions through the storage controller 415 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device may further read information from the mass storage device 426 by detecting the physical states or characteristics of one or more particular locations within the physical storage units.

In addition to the mass storage device 426 described above, the computing device may have access to other computer-readable media to store and retrieve information, such as program modules, data structures, or other data. Thus, the application 429, other data and other modules are depicted as data and software stored in the mass storage device 426, however, it should be appreciated that these components and/or other modules may be stored, at least in part, in other computer-readable storage media of the computing device. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computing device.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device. For purposes of the claims, the phrase "computer storage medium," "computer-readable storage medium," and variations thereof, does not include waves or signals per se and/or communication media.

The mass storage device 426 may store an operating system 427 utilized to control the operation of the computing device. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 426 may store other system or application programs and data utilized by the computing devices, such as any of the other software components and data described above. The mass storage device 426 might also store other programs and data not specifically identified herein.

In one embodiment, the mass storage device 426 or other computer-readable storage media is encoded with computer-executable instructions which, when loaded into the computing device, transform the computer from a general-purpose computing system into a special-purpose computer capable of implementing the embodiments described herein. These computer-executable instructions transform the computing device by specifying how the CPUs 404 transition between states, as described above. According to one embodiment, the computing device has access to computer-readable storage media storing computer-executable instructions which, when executed by the computing device, perform the various routines described above with regard to FIG. 2 and FIG. 3, and the other FIGURES. The computing device might also include computer-readable storage media for performing any of the other computer-implemented operations described herein.

The computing device may also include one or more input/output controllers 416 for receiving and processing input from a number of input devices, such as a keyboard, a mouse, a microphone, a headset, a touchpad, a touch screen, an electronic stylus, or any other type of input device. Also shown, the input/output controller 416 is in communication with an input/output device 425. The input/output controller 416 may provide output to a display, such as a computer monitor, a flat-panel display, a digital projector, a printer, a plotter, or other type of output device. The input/output controller 416 may provide input communication with other devices such as a microphone, a speaker, game controllers and/or audio devices.

For example, the input/output controller 416 can be an encoder and the output device 425 can include a full speaker system having a plurality of speakers. The encoder can use a spatialization technology, such as Dolby Atmos, HRTF or another Ambisonics-based technology, and the encoder can process audio output audio or output signals received from the application 429. The encoder can utilize a selected spatialization technology to generate a spatially encoded stream that appropriately renders to the output device 425.

The computing device can process audio signals in a number of audio types, including but not limited to 2D bed audio, 3D bed audio, 3D object audio and audio data Ambisonics-based technology as described herein.

2D bed audio includes channel-based audio, e.g., stereo, Dolby 5.1, etc. 2D bed audio can be generated by software applications and other resources.

3D bed audio includes channel-based audio, where individual channels are associated with objects. For instance, a Dolby 5.1 signal includes multiple channels of audio and each channel can be associated with one or more positions. Metadata can define one or more positions associated with individual channels of a channel-based audio signal. 3D bed audio can be generated by software applications and other resources.

3D object audio can include any form of object-based audio. In general, object-based based audio defines objects that are associated with an audio track. For instance, in a movie, a gunshot can be one object and a person's scream can be another object. Each object can also have an associated position. Metadata of the object-based audio enables applications to specify where each sound object originates and how it should move. 3D bed object audio can be generated by software applications and other resources.

Output audio data generated by an application can also define an Ambisonics representation. Some configurations can include generating an Ambisonics representation of a sound field from an audio source signal, such as streams of object-based audio of a video game. The Ambisonics representation can also comprise additional information describing the positions of sound sources, wherein the Ambisonics data can be include definitions of a Higher Order Ambisonics representation.

Higher Order Ambisonics (HOA) offers the advantage of capturing a complete sound field in the vicinity of a specific location in the three-dimensional space, which location is called a 'sweet spot'. Such HOA representation is independent of a specific loudspeaker set-up, in contrast to channel-based techniques like stereo or surround. But this flexibility is at the expense of a decoding process required for playback of the HOA representation on a particular loudspeaker set-up.

HOA is based on the description of the complex amplitudes of the air pressure for individual angular wave numbers k for positions x in the vicinity of a desired listener position, which without loss of generality may be assumed to be the origin of a spherical coordinate system, using a truncated Spherical Harmonics (SH) expansion. The spatial resolution of this representation improves with a growing maximum order N of the expansion.

In addition, or alternatively, a video output 422 may be in communication with the chipset 406 and operate independently of the input/output controllers 416. It will be appreciated that the computing device may not include all of the components shown in FIG. 4, may include other components that are not explicitly shown in FIG. 4, or may utilize an architecture completely different than that shown in FIG. 4.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device, comprising:
   a processor;
   a memory having computer-executable instructions stored thereupon which, when executed by the processor, cause the computing device to
   receive media data from a media platform, wherein the media data comprises at least one of 3D audio data, Ambisonics data, and channel-based audio data,
   receive information defining a size of at least one physical characteristic of a user, wherein the information further identifies a location of a remote device associated with the user,
   analyzing a plurality of HRTF datasets, wherein individual HRTF datasets of the plurality of HRTF datasets define a location and a range of sizes for the at least one physical characteristic,
   selecting a single HRTF dataset from the plurality of HRTF datasets if the size of the at least one physical characteristic is within the range of sizes of the single HRTF dataset, wherein the single HRTF dataset is selected when the location defined in the single HRTF dataset is associated with the location of the remote device, using the single HRTF dataset to generate, at the computing device, user personalized audio data from the media data, wherein the user personalized audio data comprises at least one audio component that is customized by the single HRTF dataset, and communicate the user personalized audio data from the computing device to the remote device for playback of the user personalized audio data at the remote device.

2. The computing device according to claim 1, wherein the computing device is configured to communicate the user personalized audio data to an endpoint device coupled remotely to the computing device.

3. The computing device according to claim 1, wherein the computing device is configured to receive user identification information, and access an HRTF data database to retrieve the unique HRTF data associated with the user identification information, and wherein the user personalized audio data is generated at least in part using the unique HRTF data associated with the user identification information.

4. The computing device according to claim 1, wherein the computing device is configured to receive information data associated with the user of an endpoint device to receive the user personalized audio data, and generate the user personalized audio data using the default HRTF data based at least on the information data.

5. The computing device according to claim 4, wherein the information data comprises at least a head size associated with the user, an age associated with the user, or a gender associated with the user.

6. The computing device according to claim 4, wherein the computing device is configured to select the default HRTF data from a plurality of default HRTF data stored in an HRTF data database.

7. A method, comprising:
receiving media data from a media platform at a computing device, wherein the media data comprises at least one of 3D audio data, Ambisonics data, and channel-based audio data;
receiving information defining a speaker configuration and a size of at least one physical characteristic of a user;
analyzing a plurality of HRTF datasets, wherein individual HRTF datasets of the plurality of HRTF datasets define a speaker configuration parameter and a range of sizes for the at least one physical characteristic,
selecting a single HRTF dataset from the plurality of HRTF datasets when the size of the at least one physical characteristic is within the range of sizes of the single HRTF dataset and when the speaker configuration is associated with the speaker configuration parameter,
using the single HRTF dataset to generate, at the computing device, user personalized audio data from the media data, wherein the user personalized audio data comprises at least one audio component that is customized by the single HRTF dataset; and
communicate the user personalized audio data from the computing device to a remote device for playback of the user personalized audio data at the remote device.

8. The method of claim 7, wherein the computing device is configured to communicate the user personalized audio data to an endpoint device coupled remotely to the computing device.

9. The method of claim 7, wherein the computing device is configured to receive user identification information, and access an HRTF data database to retrieve the unique HRTF data associated with the user identification information, and wherein the user personalized audio data is generated at least in part using the unique HRTF data associated with the user identification information.

10. The method of claim 7, wherein the computing device is configured to receive information data associated with the user of an endpoint device to receive the user personalized audio data, and generate the user personalized audio data using the default HRTF data based at least on the information data.

11. The method of claim 7, wherein the information data comprises at least a head size associated with the user, an age associated with the user, or a gender associated with the user.

12. The method of claim 7, wherein the computing device is configured to select the default HRTF data from a plurality of default HRTF data stored in an HRTF data database.

13. A non-transitory computer readable medium having stored thereon software instructions that, when executed by a computing device, cause the computing device to perform operations comprising:
receiving media data from a media platform at a computing device, wherein the media data comprises at least one of 3D audio data, Ambisonics data, and channel-based audio data;
receiving information defining a speaker configuration and a size of at least one physical characteristic of a user;
analyzing a plurality of HRTF datasets, wherein individual HRTF datasets of the plurality of HRTF datasets define a speaker configuration parameter and a range of sizes for the at least one physical characteristic,
selecting a single HRTF dataset from the plurality of HRTF datasets when the size of the at least one physical characteristic is within the range of sizes of the single HRTF dataset and when the speaker configuration is associated with the speaker configuration parameter,
using the single HRTF dataset to generate, at the computing device, user personalized audio data from the media data, wherein the user personalized audio data comprises at least one audio component that is customized by the single HRTF dataset; and
communicate the user personalized audio data from the computing device to a remote device for playback of the user personalized audio data at the remote device.

14. The non-transitory computer readable medium of claim 13, wherein the computing device is configured to communicate the user personalized audio data to an endpoint device coupled remotely to the computing device.

15. The non-transitory computer readable medium of claim 13, wherein the computing device is configured to receive user identification information, and access an HRTF data database to retrieve the unique HRTF data associated with the user identification information, and wherein the user personalized audio data is generated at least in part using the unique HRTF data associated with the user identification information.

16. The non-transitory computer readable medium of claim 13, wherein the computing device is configured to receive information data associated with the user of an endpoint device to receive the user personalized audio data, and generate the user personalized audio data using the default HRTF data based at least on the information data.

17. The non-transitory computer readable medium of claim 13, wherein the information data comprises at least a head size associated with the user, an age associated with the user, or a gender associated with the user.

18. The non-transitory computer readable medium of claim 13, wherein the computing device is configured to select the default HRTF data from a plurality of default HRTF data stored in an HRTF data database.

* * * * *